United States Patent
Ghorbani et al.

(10) Patent No.: US 7,724,453 B2
(45) Date of Patent: May 25, 2010

(54) VACUUM CELL FOR OPTICAL COMPONENTS

(75) Inventors: Arash Ghorbani, Auburn, CA (US); Peter Frank, Grass Valley, CA (US); R. Ian Edmond, Meadow Vista, CA (US)

(73) Assignee: Coherent, Inc., Santa Clara, CA (US)

( * ) Notice: Subject to any disclaimer, the term of this patent is extended or adjusted under 35 U.S.C. 154(b) by 692 days.

(21) Appl. No.: 11/589,352

(22) Filed: Oct. 30, 2006

(65) Prior Publication Data

US 2007/0297466 A1 Dec. 27, 2007

Related U.S. Application Data

(60) Provisional application No. 60/814,737, filed on Jun. 19, 2006.

(51) Int. Cl.
*G02B 7/02* (2006.01)
*G02B 3/12* (2006.01)
*G02B 7/00* (2006.01)

(52) U.S. Cl. .................. 359/819; 359/667; 359/738

(58) Field of Classification Search ......... 359/819–824, 359/666, 667, 499, 500, 738
See application file for complete search history.

(56) References Cited

U.S. PATENT DOCUMENTS

| 3,621,273 | A | | 11/1971 | Rorden et al. ............. 307/88.3 |
| 4,159,075 | A | * | 6/1979 | Ljung et al. ................ 228/116 |
| 4,274,028 | A | * | 6/1981 | Frame ........................ 313/530 |
| 6,532,100 | B1 | | 3/2003 | Partanen et al. ............ 359/326 |
| 2002/0149859 | A1 | * | 10/2002 | Muto et al. ................. 359/694 |
| 2005/0008047 | A1 | | 1/2005 | Hashimoto et al. ........... 372/22 |

FOREIGN PATENT DOCUMENTS

JP 11-223843 8/1999
WO WO 2005/096090 A1 10/2005

* cited by examiner

*Primary Examiner*—Mohammed Hasan
(74) *Attorney, Agent, or Firm*—Morrison & Foerster LLP

(57) ABSTRACT

A moisture sensitive optically nonlinear crystal is enclosed in a hermetically sealed elongated vacuum cell. The vacuum cell has an input window at one end and an output window at an opposite end providing optical access to the crystal by a laser beam. The windows are attached to the cell by cold-formed, indium-metal ram-seals. In an example of the cell in which the crystal is arranged to generate UV radiation from the laser beam, the output window is located at a sufficient distance from the crystal that the flux of UV radiation incident on the output window is below the damage threshold of the window for the UV radiation.

7 Claims, 4 Drawing Sheets

VACUUM CELL FOR OPTICAL COMPONENTS

PRIORITY CLAIM

This application claims priority from prior provisional application Ser. Nos. 60/814,737, filed Jun. 19, 2006, which are incorporated herein by reference.

TECHNICAL FIELD OF THE INVENTION

The present invention relates in general to packaging of environmentally sensitive optical components for minimizing environmental degradation of such components. The invention relates in particular to minimizing degradation of optically nonlinear crystals used for laser wavelength conversion.

DISCUSSION OF BACKGROUND ART

Optical components fabricated from optically nonlinear crystals are commonly employed for wavelength conversion in laser systems. A well-known example of wavelength conversion is the process of harmonic generation, wherein an appreciable fraction of the power contained in a beam of laser light having a particular wavelength and a corresponding fundamental optical frequency is shifted to a different wavelength, specifically a wavelength associated with an integer multiple or harmonic of the fundamental frequency, by propagating the beam through an appropriate crystal element. Through this process of harmonic generation, a laser system otherwise capable of directly producing only infrared (IR) light may generate visible or even ultraviolet (UV) wavelength light through one or more cascaded harmonic conversion steps.

Preferred optically nonlinear materials for converting IR wavelengths to visible wavelengths, or visible wavelengths to UV wavelengths, include synthetic crystals such as potassium dihydrogen phosphate (KDP) and its isomorphs as well as various crystalline borate compounds including beta-barium borate (BBO), lithium triborate (LBO), cesium borate (CBO) and cesium lithium borate (CLBO). A characteristic common to these particular materials is that all are water-soluble, and in general they are hygroscopic, especially CBO and CLBO.

Hygroscopic materials absorb and retain water present in the surrounding atmosphere. This can be quite problematic for a high-precision optical component made from a hygroscopic material.

The optical quality of polished surfaces of a hygroscopic crystal tends to degrade with extended exposure to water vapor due to gradual dissolution at the surfaces as water is taken up by the material. Such degradation is commonly characterized by a loss of transparency associated with increased scatter from a roughened surface or, in extreme cases, with distortion of the surface figure. Such effects generally degrade both the conversion efficiency and the frequency-converted laser beam quality obtainable from a degraded harmonic conversion crystal.

One well-known means of protecting polished surfaces of an optical component made from a hygroscopic material is to maintain the component temperature higher than the temperature of its immediate surroundings. This approach can be quite effective but has the drawback of requiring the presence of a controlled heat source and the need to provide power to the heat source Another means of protecting polished crystalline surfaces is coating the surfaces with a transparent, water-impermeable barrier coating. However, such coatings are frequently associated with other problems, particularly for coatings dense and thick enough to provide an effective barrier. Edge-chipping, cracking, or crazing can often be observed to occur in such barrier coatings as a result of temperature cycling. In addition, such coatings may also degrade or be damaged more quickly than bulk materials, particularly as a result of extended exposure to intense laser light.

Yet another means of protecting a hygroscopic optical component from deterioration is disclosed in U.S. Pat. No. 3,621,273. Here, the component is contained within a hermetically sealed cell, optically accessible via windows sealed to cell, and arranged to be free from water vapor or other sources of contamination. This provides that the component is protected not only from exposure to water vapor, but from exposure to other contaminants such as dust and organic vapors. Such a cell can be directly installed within a laser system. The interior of such a cell is preferably evacuated and arranged to remain gas-free during operation, or evacuated then back-filled with a dry, inert atmosphere. In either case robust and reliable window seals are required for the cell.

Prior-art vacuum-tight window sealing techniques can be problematic for a variety of reasons. Mechanical methods tend to rely upon bulky, flanged window retaining structures that apply and maintain compressive forces sufficient to deform a sealing gasket situated between a window and a mating surface. Brazing or soldering techniques not only require selective metallization of window surfaces but also involve highly elevated temperatures unlikely to be tolerated by a delicate optical component situated in close proximity to a seal. Adhesives such as cured epoxies can be used to attach and seal windows but are prone to out-gassing, particularly during curing but also over extended time periods. Out-gassing products can contaminate the component enclosed in the cell.

Yet another problem may be encountered in damage to windows of an enclosure from exposure to laser radiation. This is a problem in particular when the cell contains a crystal that is generating ultraviolet radiation.

There is a need for a cell for enclosing an environmentally sensitive optically nonlinear crystal that minimizes contamination of the crystal by construction materials of the cell.

SUMMARY OF THE INVENTION

The present invention is directed to an enclosure housing for housing a transparent optical component. The enclosure includes a body and first and second windows. A through-passage extends through the body from one end of the body to the other. The first and second windows cover the through-passage of the body at the ends thereof. Each of the windows is attached to the body by a gas-tight, pressed-metal gasket. The transparent optical component is located in the through-passage of the body between the first and second windows.

In one preferred embodiment of the apparatus one of the windows serves as an input window and the other window serves as an output window. The optical component is an elongated optically nonlinear crystal arranged to convert radiation directed therethorough to ultraviolet radiation. The optically nonlinear crystal is spaced apart by a distance from the out window greater than the length of the optically nonlinear crystal.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
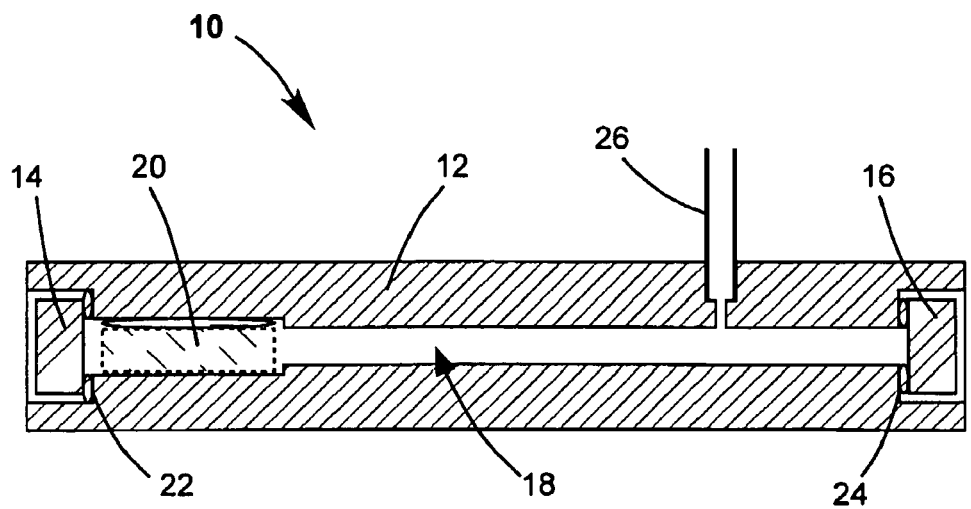
FIG. 1 is cross-section view schematically illustrating one preferred embodiment of a vacuum cell in accordance with the present invention, having an input window and an output window at opposite ends thereof, having an exhaust tube located in a wall thereof proximate the output window, and enclosing an optically nonlinear crystal located proximate the input window.

Referring now to the drawings, wherein like features are designated by like reference numerals, FIG. 1 is a cross-section view schematically illustrating one preferred embodiment 10 of a vacuum cell in accordance with the present invention. Cell 10 includes an elongated, rigid enclosure-body 12, preferably of a metal such as kovar, stainless steel, or non-anodized aluminum or an alloy thereof. Optical access to the cell is provided through an optical input window 14 and an optical output window 16. Body 12 is completely penetrated by a through-passage 18 to allow propagation of light through cell 10 and particularly through an optical component 20 enclosed therein, here, an optically nonlinear crystal. By way of example, optically nonlinear crystal 20 may be a crystal of as potassium KDP, BBO, LBO, CBO or CLBO. A characteristic common to these particular materials is that all are water-soluble, and in general they are hygroscopic, especially CBO and CLBO. Input window 14 is located in close proximity to the location of optical component 20 but comparatively distant from output window 16.

Body 12 is preferably composed of a monolithic block of material, preferably, containing only the ports depicted in FIG. 1. Minimizing the amount of ports helps make the enclosure mechanically stable, rigid, and free from unintended leaks. The external shape of body 12 can be adapted as necessary to be compatible with suitable mounting hardware (not shown) and to provide reference surfaces as necessary for accurate positioning. In one preferred embodiment, body 12 is a thick-walled cylinder with a circular cross-section as viewed perpendicular to through-passage 18. Alternate cross-sections, such as square or rectangular, may also be selected without departing from the spirit and scope of the present invention.

Input window 14 is attached to body 12 by a gasket 22. Gasket 22 mechanically supports input window 14 and also provides a hermetic seal between the enclosure body 12 and window 14. Output window 16 is attached with output-window gasket 24 to body 12. Input window 16 is attached to body 12 by a gasket 24. Output-window gasket 24 mechanically supports output window 16 and also provides a hermetic seal between body 12 and window 16. Gaskets 24 are preferably of a soft metal such as indium (In) or alloys thereof with indium being particularly preferred. A method of creating a gasket-seal with indium is discussed further hereinbelow.

A sealable vacuum port 26 communicates with through-passage 18 to allow evacuation of gases contained within cell 10. Evacuation can be effected by connecting port 26 to a vacuum pump (not shown) subsequent to attachment and sealing of output window 16 and input window 14.

Figure 2:
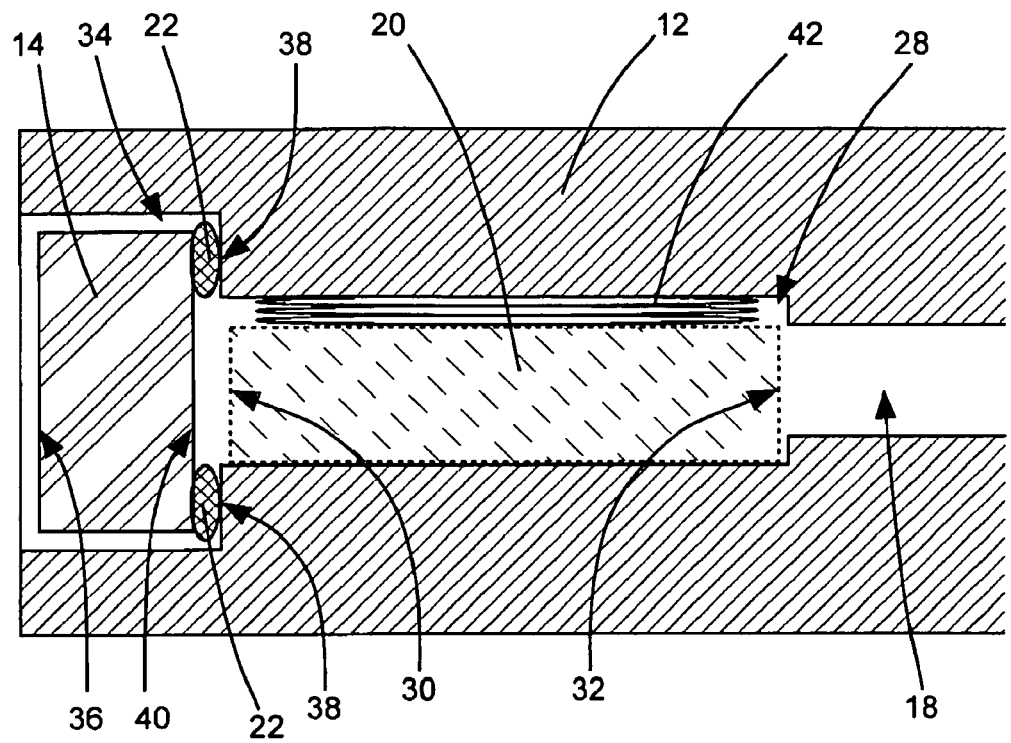
FIG. 2 is cross-section view schematically illustrating details of the input window and the optically nonlinear crystal of FIG. 1.

FIG. 2 is a cross-section view schematically illustrating details of the input-window end of cell 10. A component cavity 28 in body 12 is located at input end of through-passage 18 and is sized to accommodate optically nonlinear crystal 20. Crystal 20, here, has an input face 30 and an output face 32. Abutting component cavity 28 in body 12 is input window recess 34 for accommodating input window 14. The depth of recess 34 is preferably sufficient to completely surround the sides of input window 14 as depicted. This allows a portion of body 12 to act as a protective side shroud or window guard. Alternatively, recess 34 may be made shallow enough to fully expose an outward-facing surface 36 of window 14 to make cleaning of surface 36 more convenient. Recess 34 has an outward-facing inner surface 38. Surface 34 is most preferably a flat, polished surface suitable for establishing complete and uniform contact with input-window gasket 22.

In a preferred method of installing window 14 on body 12, gasket 22 is preferably formed from a cold-formed high-purity indium metal ring. The ring is inserted into recess 34 in contact with surface 38 thereof. Window 14 is then inserted into recess 34. A distributed load is next applied normal to surface 36 of window 14, for example, by means of a mechanically operated arbor press (not shown). Upon application of a distributed load to surface 36 of window 14, gasket 22 cold-flows into intimate contact with both an inward-facing surface 40 of input window 14 and the outward-facing surface 38 of body 12, thereby forming a robust hermetic seal. When the surfaces contacting gasket 22 are fully wetted, a condition that can be readily verified by visual inspection through window 14, no additional mechanism for retaining the window attached to the cell body is required. The integrity of the seal can be maintained for a time period estimated to be several years.

The cold-formed indium ram seal described above is preferred over other window mounting and sealing techniques because of the simplicity and long term integrity of the seal. The seal so obtained is an essentially permanent ultra-high vacuum seal able to maintain, for example, a vacuum better than $10^{-6}$ Torr. It has been experimentally determined that if the facing (sealing) surfaces are flat and free from contaminants, and the assembly is performed under Class 1000, or better, clean room conditions using pure indium metal gaskets, it is unnecessary to pre-tin or otherwise metallize either the windows or the cell body to obtain a good seal. Since no additional retaining hardware is necessary, the number of parts and labor required to assemble cell 10 are minimized. Further, the diameter of the enclosure body 12 need not be significantly greater than the diameter of the windows, so the external dimensions of cell 10 can be kept small enough to facilitate installation into laser systems with only a limited amount of available space.

Component cavity 28 is preferably dimensioned so that output face 32 of optically nonlinear crystal 20, when installed, is in close proximity to the junction between cavity 28 and through-passage 18, while the inward-facing surface 40 of input window 14 is located in close proximity to input face 30 of the optically nonlinear crystal.

Crystal 20 is preferably retained within component cavity 28 by flattened metal leaf spring 42. Leaf spring 42 applies a distributed, compliant force along one side of crystal 20 to restrain undesired movement within cavity 28 during routine handling of cell 10. The flexible nature of leaf spring 42 also accommodates unavoidable dimensional changes and relieves associated stresses due to temperature cycling, which otherwise could cause crystal 20 to fracture.

In the example of crystal 20 depicted in FIGS. 1 and 2 input and output faces of the crystal are oriented at near-normal incidence to an optical axis defined by the centerline of through-passage 18. In this configuration, the input and output faces are preferably anti-reflection coated to minimize optical transmission losses due to Fresnel reflections. Those skilled in the art will recognize without further illustration that input face 30 may be cut at an angle other than normal to an incident laser beam, for example, to direct back-reflections away from the incident optical axis. In an example where optically nonlinear crystal 20 is configured as a Type II frequency converter, input face 30 may be cut at an angle suitable for Poynting-vector walk-off compensation for improved frequency conversion efficiency.

Figure 3:
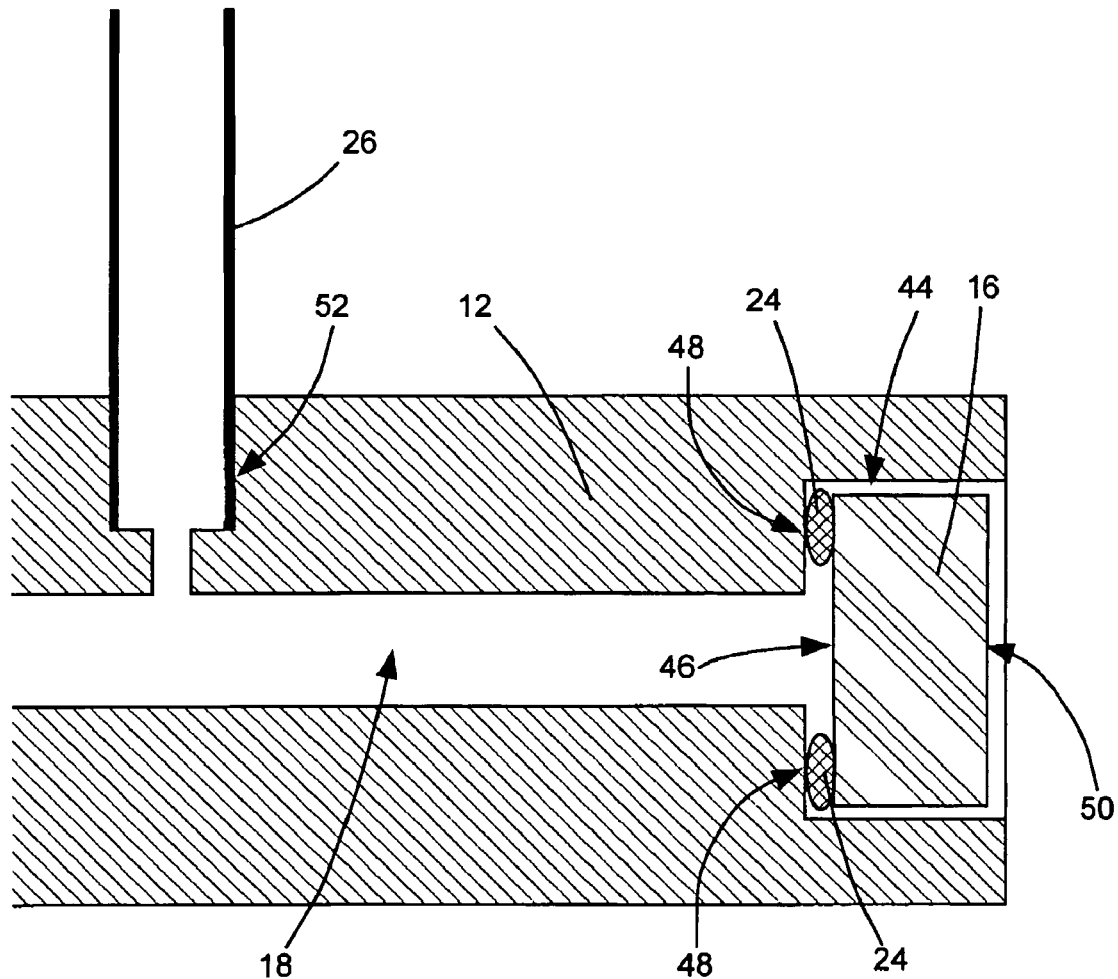
FIG. 3 is cross-section view schematically illustrating details of the output window and the exhaust tube of FIG. 1.

FIG. 3 is a cross-section view schematically illustrating the output-window end of cell 10 of FIG. 1. A recess 44 is formed in body 12 surrounding the output end of through-passage 18, for accommodating window 16. Output-window gasket 24 is compressed between an inward-facing surface 46 of output window 16 and an outward-facing surface 48 of output-window recess 44 to attach window 16 to body 12 and establish a hermetic seal. This is preferably accomplished by the method described above for attaching and sealing window 14. The depth of recess 44 is preferably sufficient to completely enclose output window 16 as depicted, and to allow a portion of body 12 to act as a protective side shroud or window guard. Alternatively, recess 44 may be made shallow enough to expose outward-facing surface 50 of window 16 to make cleaning this surface more convenient.

Vacuum port 26 is rigidly attached to body 12 and provides a conduit through which gases contained in through-passage 18 can be evacuated. In a preferred embodiment, in which body 12 is formed from aluminum, vacuum port 26 is a short section of copper tubing that is brazed directly into socket 52 formed in body 12 to obtain a hermetic seal around the full outer circumference of the tubing. This operation is preferably performed prior to the installation of crystal 20 and attachment of windows 14 and 16. After crystal has been installed and the windows attached, cell 10 can be evacuated, and is preferably permanently sealed after evacuation by crimping closed the exposed section of vacuum port 26. Cell 10 may also be permanently sealed, after evacuation, by plugging or capping vacuum port 26 with solder or another low-outgassing material to form a hermetic seal. Here, it should be noted that instead of providing a vacuum in the cell, the cell may be filled with an inert gas and then sealed.

Figure 4:
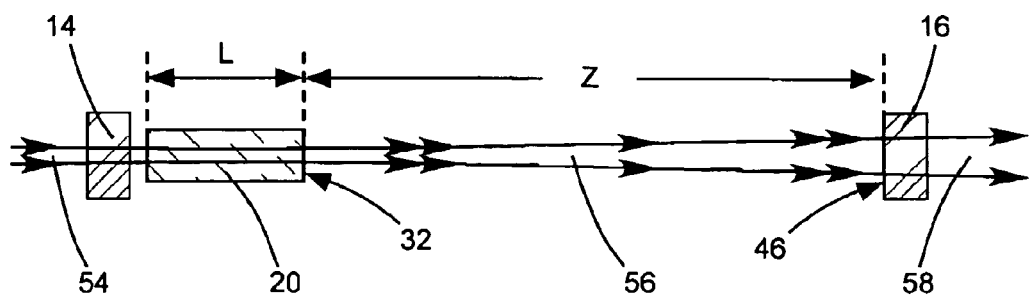
FIG. 4 schematically illustrates propagation of a focused laser beam through the input window, the optically nonlinear crystal, and the output window of the vacuum cell of FIG. 1.

FIG. 4 schematically illustrates a preferred positional relationship in accordance with the present invention between input window 14, optically nonlinear crystal 20, and output window 16. This positional relationship is particularly preferred when crystal 20 is configured and used as a frequency converter generating UV radiation, in particular UV light having a wavelength less than 350 nm. In this relationship input window 14 may be positioned relatively close to crystal 20, however, output window 16 is separated from crystal 20 by a comparatively greater distance.

In an optical arrangement in which an optically nonlinear crystal is used to generate a harmonic of an input beam, it is usual to focus the input beam into a narrow beam "waist" in the crystal. This maximizes the intensity of the beam in the crystal. Conversion efficiency in such a crystal is directly related, inter alia, to the conversion (harmonic generating) efficiency of the crystal.

By arranging the windows and crystal as depicted in FIG. 4, a laser beam having a focus (waist) within crystal 20 will have a significantly greater diameter and correspondingly lower intensity at output window 16 than the diameter and intensity of the beam at output face 38 of the crystal.

This beam propagation behavior is indicated in FIG. 4 by dashed lines outlining the path of a focused laser beam 54 exiting window 16 after entering window 14 and traversing crystal 20 and the intervening space. The distance Z indicated by the broken double-headed arrow denotes the physical separation between the output face 38 of crystal 20 and inward-facing surface 46 of output window 16. Distance Z is preferably greater than about the length L of crystal 20 but less than about 20 times length L.

The minimum desirable value of distance Z depends upon the optical damage threshold of output window 16 and the anticipated beam divergence associated with a given focal spot size and laser wavelength. The intensity of a beam of laser light incident upon a surface is, by definition, inversely proportional to the cross-sectional area of the beam footprint, so increasing spot size is necessarily associated with decreasing intensity for a given laser power level. By consideration of a known or assumed value for the damage threshold of output window 16, known or assumed values for the beam cross-section area as a function of distance away from frequency converter 20 for a particular beam configuration, and known or assumed values for laser power or energy levels, distance Z can be specified to minimize optical damage to output-window 16.

Figure 5:
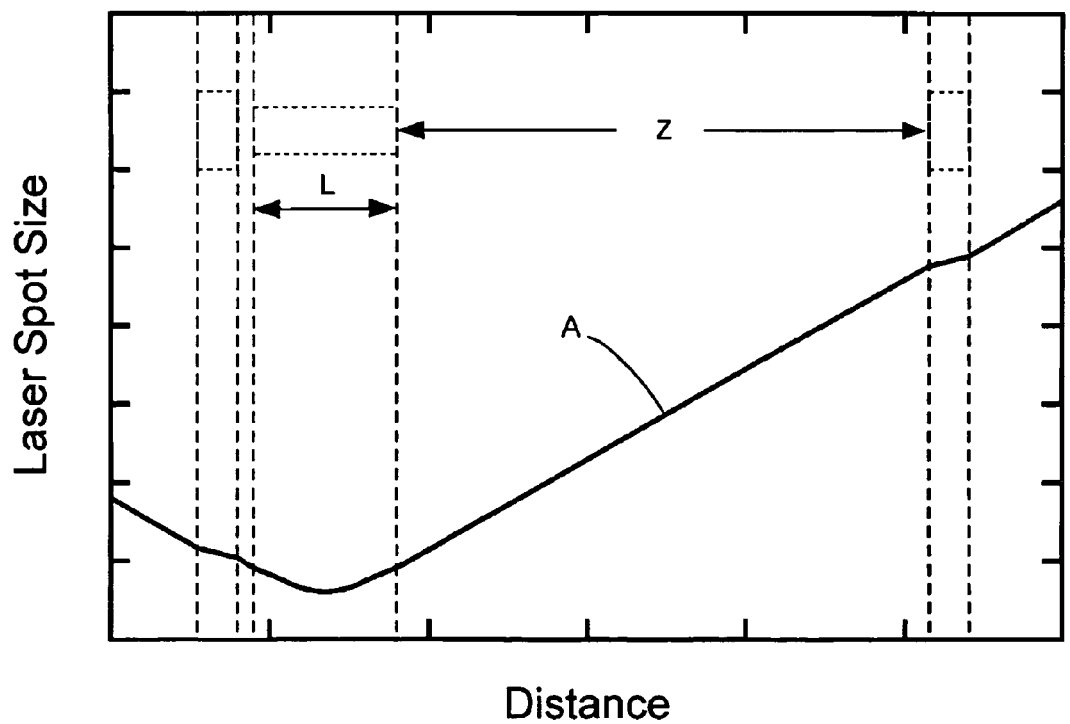
FIG. 5 is a graph schematically illustrating one example of beam size as a function of propagation distance in the arrangement of FIG. 4

FIG. 5 is a graph schematically illustrating calculated laser spot size (curve A) as a function of distance for a laser beam with a focus occurring inside crystal 20 that subsequently expands during propagation away from the focus towards output window 16. Dashed lines indicate the corresponding positioning of the surfaces of optical elements associated with the present invention. With reference again to FIG. 4, the distance Z again denotes the separation between output face 32 of crystal 20 and inward-facing surface 46 of output window 16.

For the case depicted by the graph of FIG. 5, distance Z is approximately four times greater than the length of crystal 20. By way of example, a frequency converter crystal length approximately equal to 10 mm is common so that a distance Z of approximately 40 mm would be consistent with the illustration. Over this distance it can be seen that the graphed spot size increases by approximately a factor of 8. The corresponding laser intensity will decrease by approximately a factor of 64.

Figure 6:
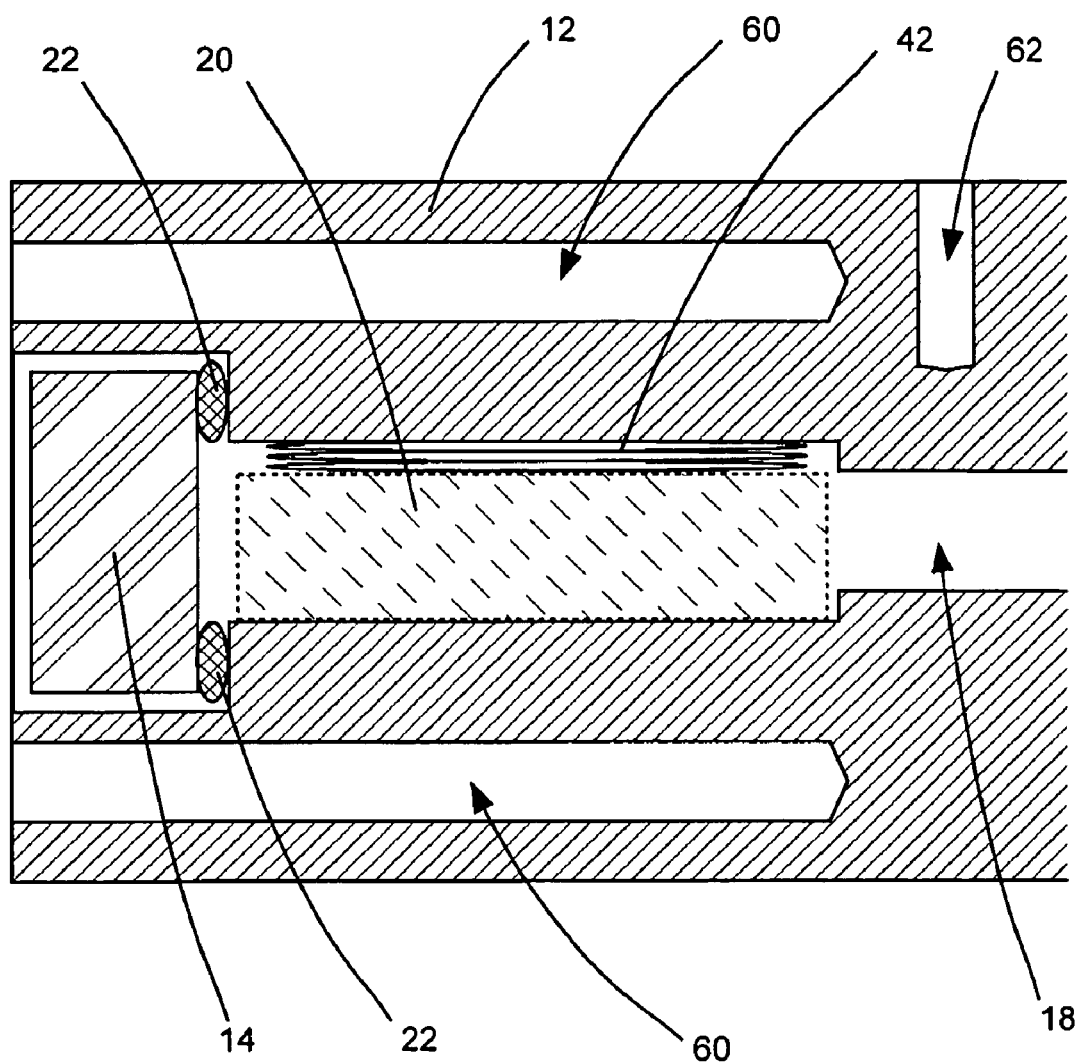
FIG. 6 is cross-section view schematically illustrating another preferred embodiment of a vacuum cell in accordance with the present invention, similar to the vacuum cell of FIG. 1, but wherein channels are included in the cell wall at the input window end of the cell.

FIG. 6 is cross-section view schematically illustrating another preferred embodiment 11 of a vacuum cell in accordance with the present invention. This embodiment is similar to the vacuum cell of FIG. 1, but includes certain modifications to input window end of the cell. Accordingly only the input of the cell is depicted in FIG. 6.

In the embodiment of FIG. 6, body 12 includes at least one channel 60 suitable for accepting at least one heating element (not shown). Suitable heating elements include electric-powered resistive heaters commonly known as cartridge heaters. Body 12 in this embodiment also includes at least one blind cavity 62 to accept at least one temperature sensor for monitoring the interior temperature of body 12.

In addition to being dependent on the intensity of radiation being converted, the conversion efficiency of optically nonlinear materials used in frequency converters is in general a function of both the bulk crystal temperature, and to the crystal orientation as described with respect to a propagating laser beam. For a given crystal orientation there will generally be a narrow range of preferred temperature values during operation. By incorporating a temperature sensor and at least one heating element within body 12, it is possible to both accurately determine and maintain the temperature of an enclosed optically nonlinear crystal to maximize conversion efficiency by adjusting the heating element power.

The present invention is described above in terms of a preferred and other embodiments. The present invention is not limited, however, to the embodiments described and depicted. Rather, the present invention is limited only by the claims appended hereto.

What is claimed is:

1. An optical assembly, comprising:
a metal enclosure housing a transparent optical component, said enclosure including a body and first and second windows;
said body having first and second opposite ends, and having a through-passage extending therethrough from said first end thereof to said second end thereof, said body further including a recess at each end thereof aligned with said through-passage and having a diameter larger than the diameter of the through-passage, with the inner end of each recess terminating in an annular shelf the surface thereof being oriented perpendicular to the axis of said through-passage; and
said first and second windows being each received within one of said recesses and covering said through-passage of said body at respectively said first and second ends thereof, and each thereof attached to said body by a gas-tight, pressed-metal gasket, with one side of said gasket being sealed against the shelf and the other side thereof being sealed against a radially outer portion of the inward-facing surface of the associated window, said transparent optical component being located in said through-passage of said body between said first and second windows.

2. The optical assembly of claim 1, wherein said optical component is an optically nonlinear crystal having a length L, and wherein said optical component is located in said through passage at a distance from said second window greater than about L.

3. The optical assembly of claim 1, wherein said enclosure is under vacuum.

4. The optical assembly of claim 1, wherein said enclosure is filled with an inert gas.

5. The optical assembly of claim 1, wherein said optical component is an optically nonlinear crystal arranged to generate UV-radiation from a laser beam, wherein said first window is arranged to provide optical access for said laser beam to said optically nonlinear crystal and said second window is arranged to transmit said UV-radiation out of the enclosure, and wherein said optically nonlinear crystal is located at a distance selected to minimize optical damage to said second window by said UV-radiation.

6. An optical assembly, comprising:
a hermetically sealed enclosure housing an optically nonlinear crystal;
said optically nonlinear crystal being arranged to generate UV radiation from laser beam;
said enclosure including first and second windows and said optical component being located between said first and second windows;
said first window arrange to provide optical access by said laser beam to said optically nonlinear crystal;
said second window being arranged to transmit UV radiation generated by said optically nonlinear crystal out of said enclosure; and
wherein said transparent optical component is located at a distance from said second window selected to minimize optical damage to said second window by said UV-radiation.

7. The optical assembly of claim 6, wherein said optically nonlinear crystal has a length L said selected distance is greater than about L.

* * * * *